June 1, 1937.  A. D. MOORE  2,082,211
CALCULATING MACHINE
Filed Oct. 11, 1935  5 Sheets-Sheet 1
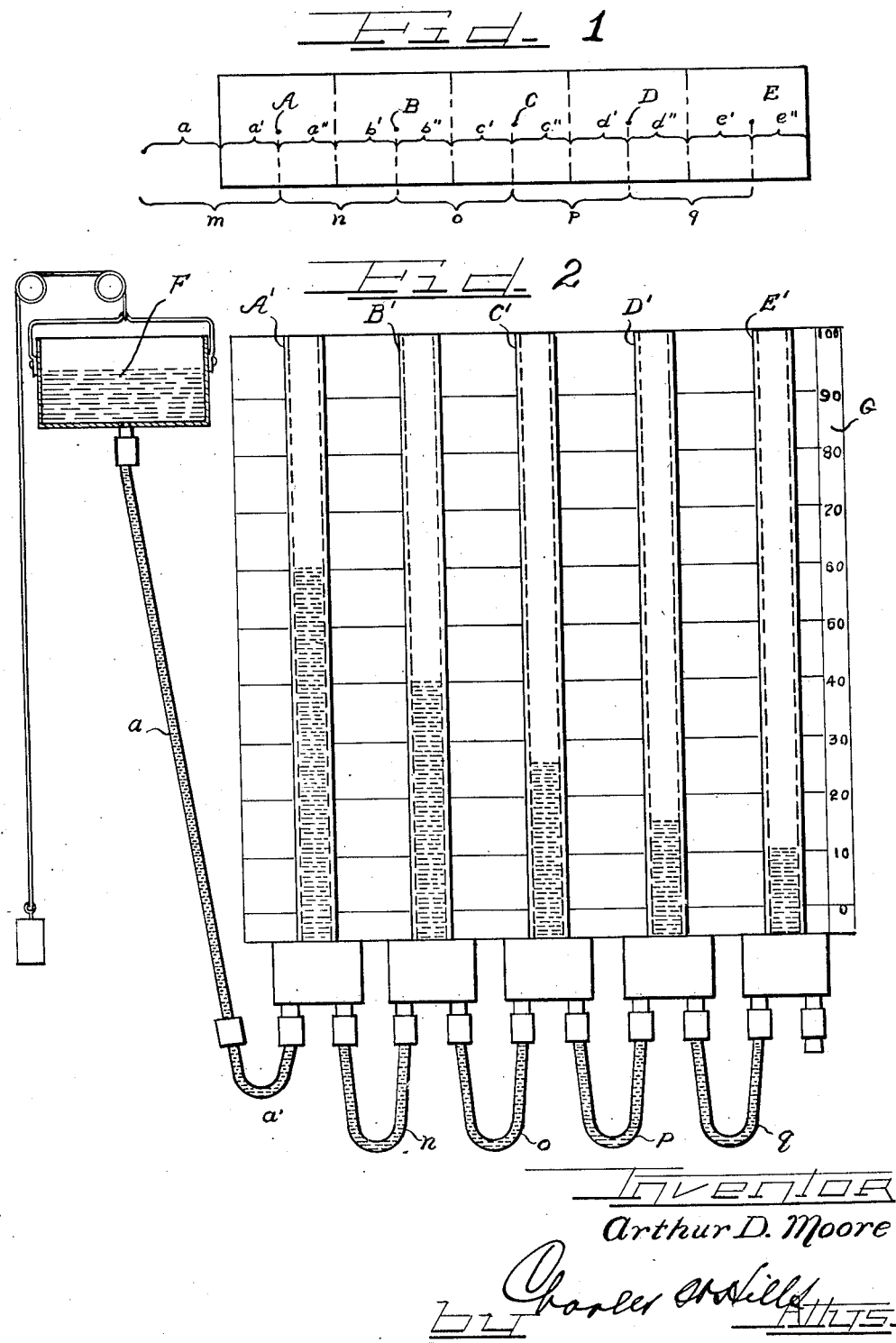
Inventor
Arthur D. Moore June 1, 1937.  A. D. MOORE  2,082,211
CALCULATING MACHINE
Filed Oct. 11, 1935    5 Sheets-Sheet 2
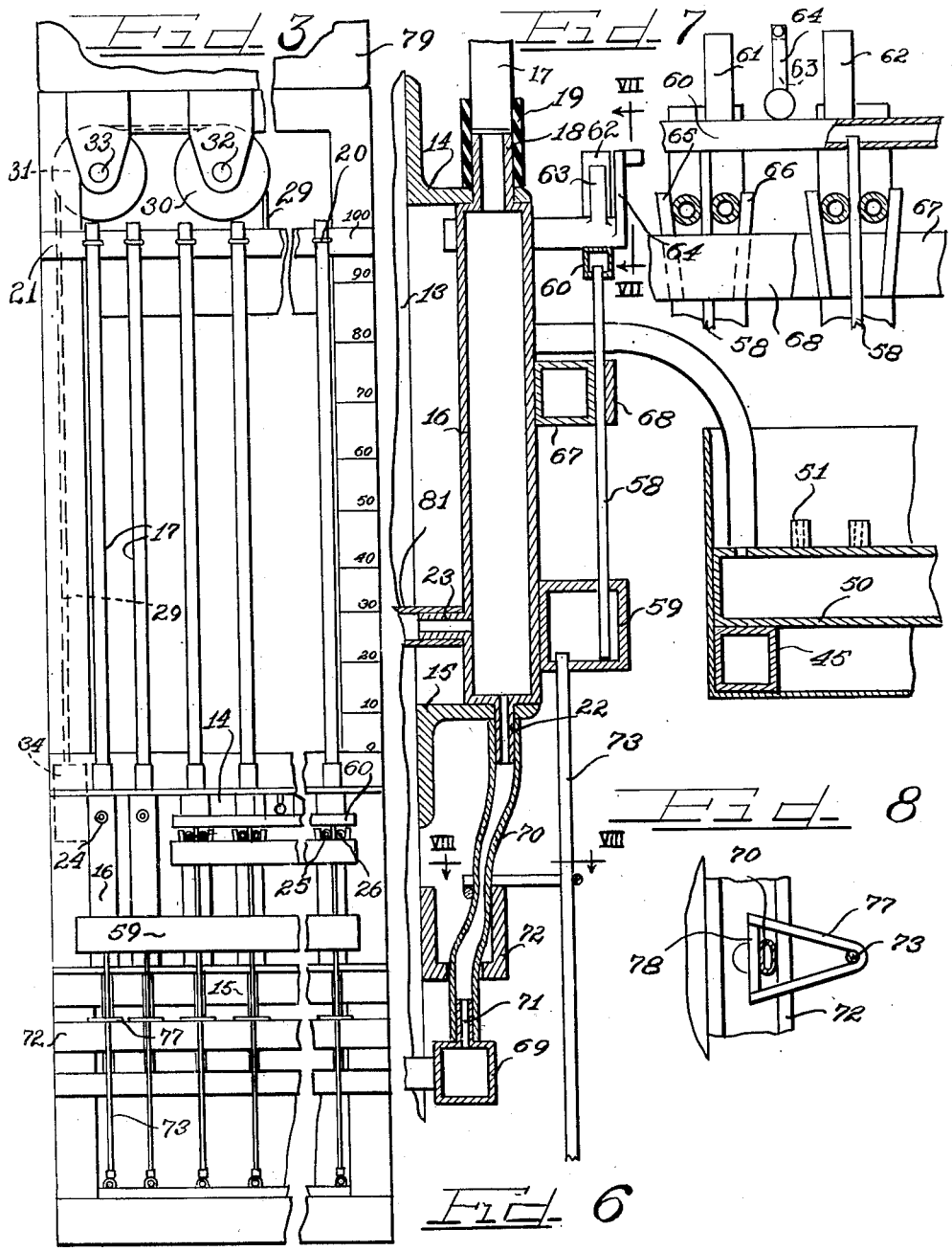
Inventor
Arthur D. Moore

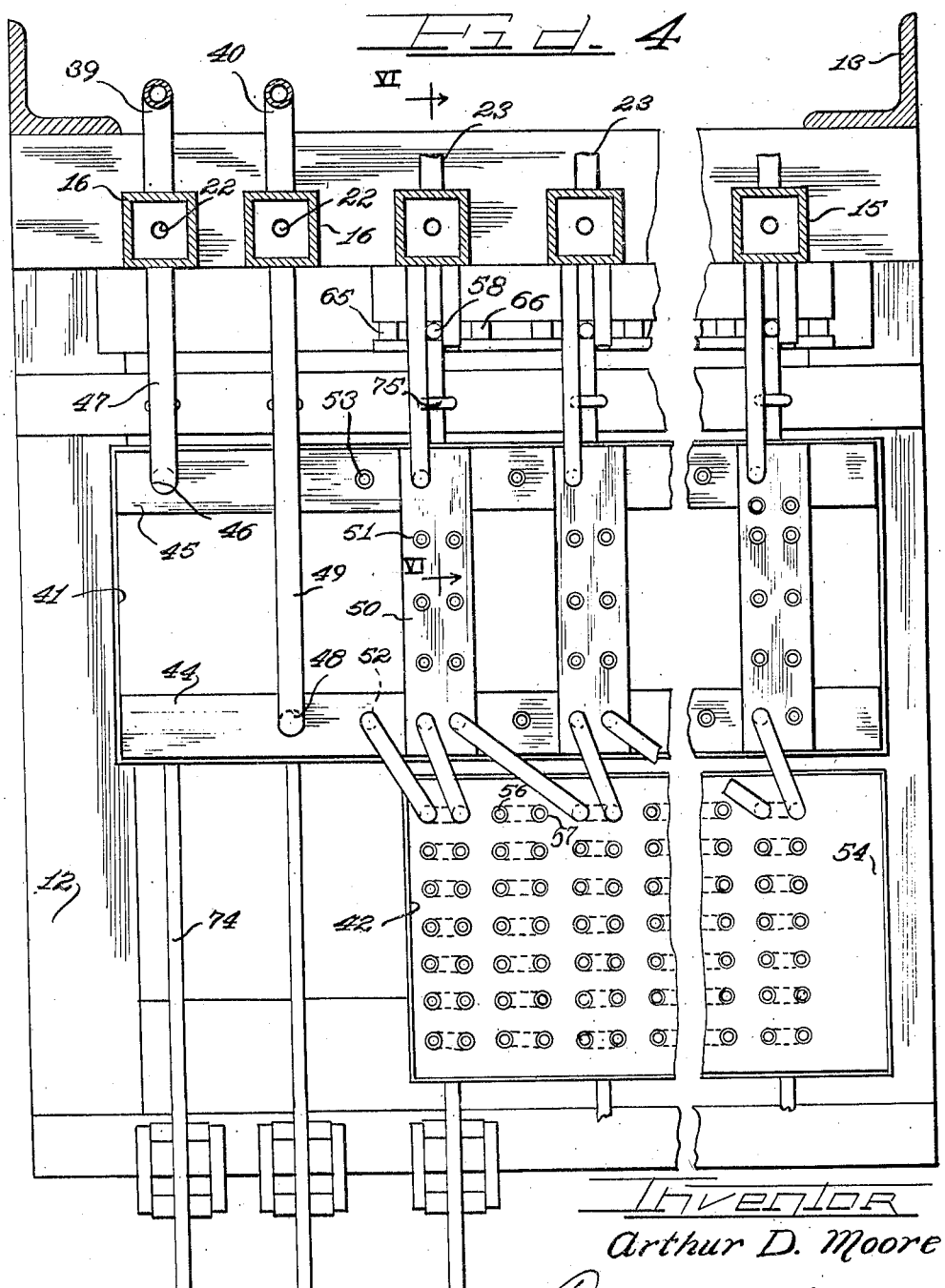

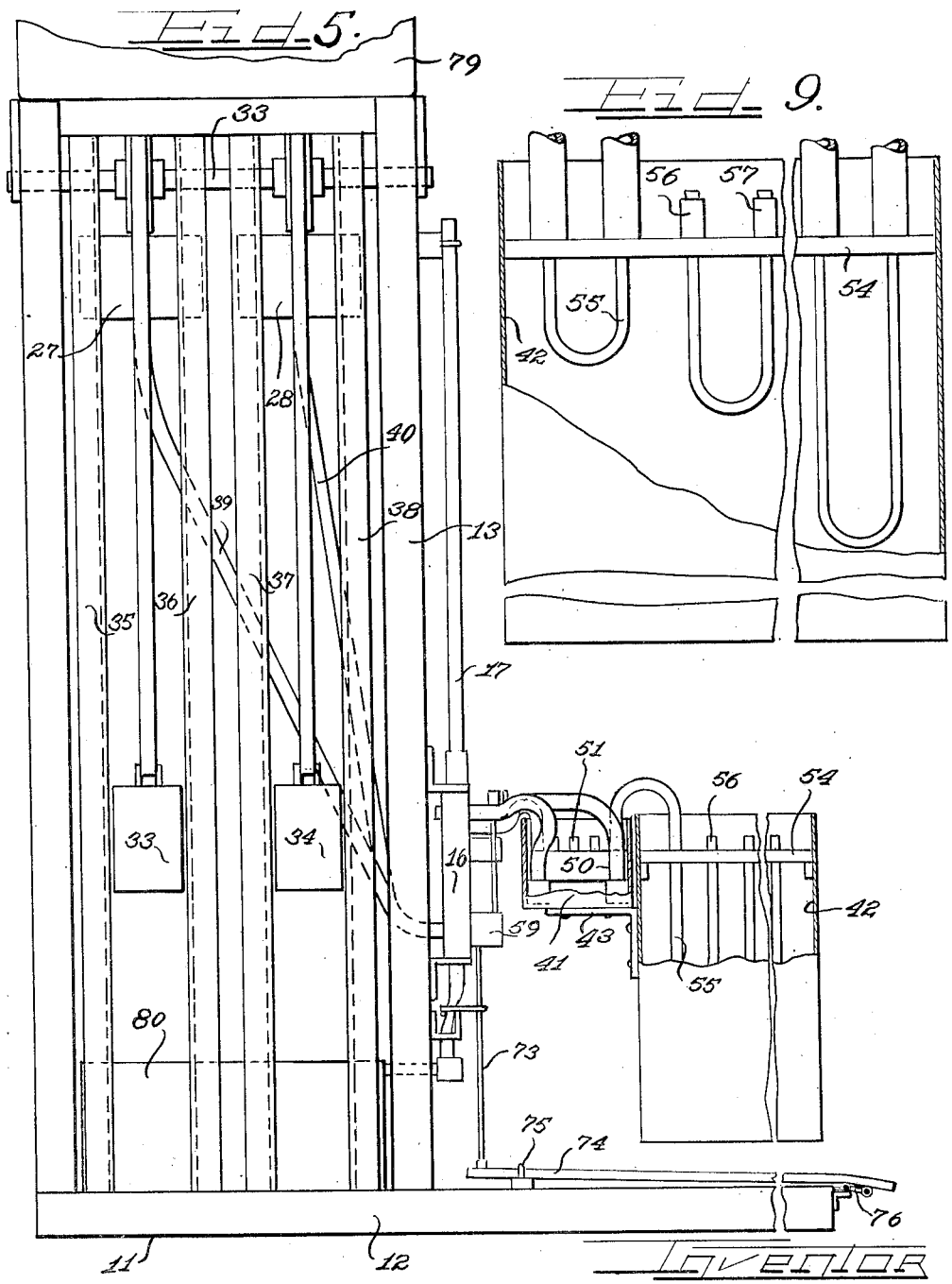

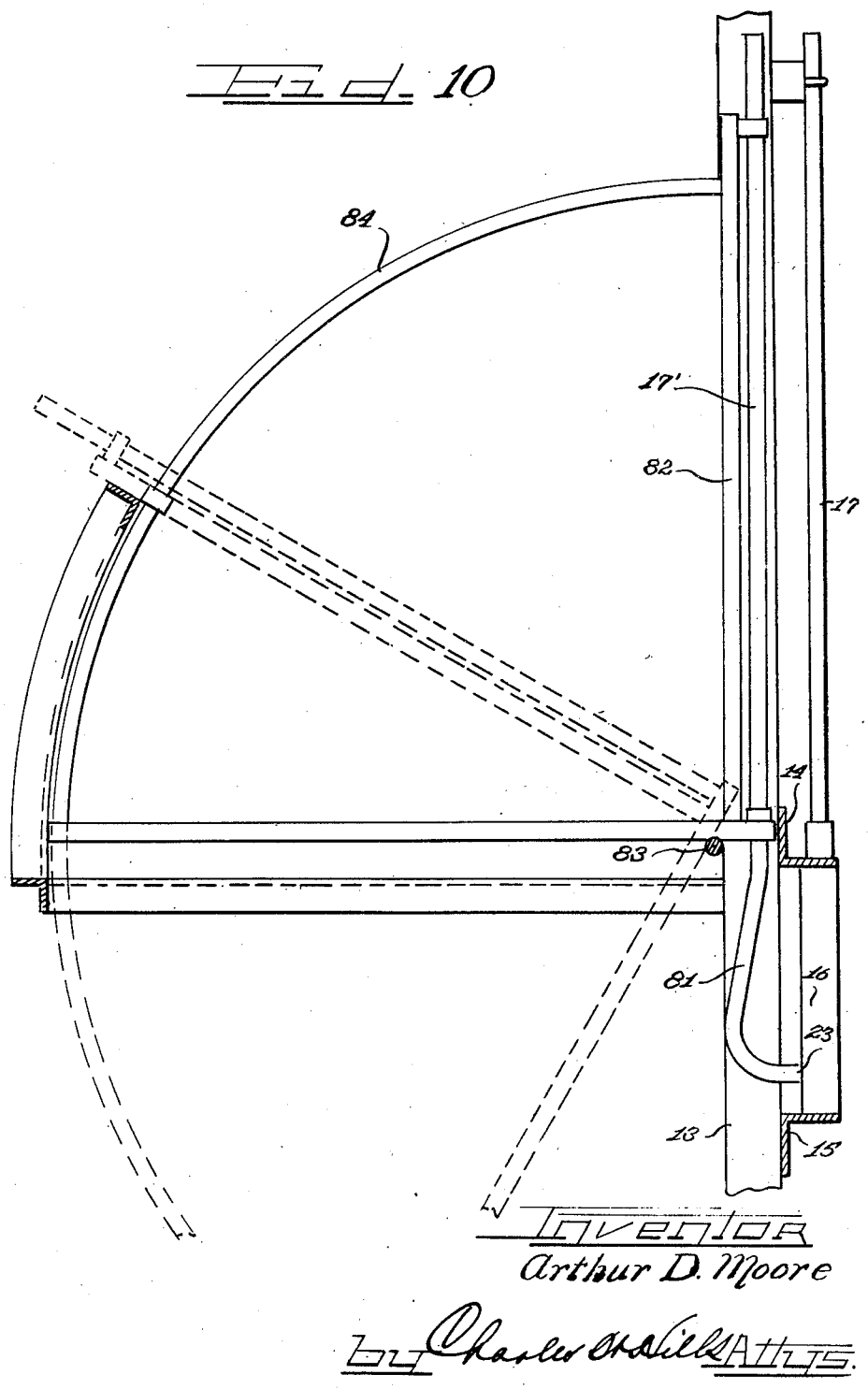

Patented June 1, 1937

2,082,211

UNITED STATES PATENT OFFICE 2,082,211

CALCULATING MACHINE

Arthur D. Moore, Ann Arbor, Mich.

Application October 11, 1935, Serial No. 44,505

14 Claims. (Cl. 235—61)

The present invention relates in general to a calculating machine and is more particularly concerned with novel means for determining the thermal characteristics of a medium resulting from a flow of heat energy therethrough, when the medium is subjected to some predetermined temperature condition.

Heretofore, in the fields of chemical, mechanical and electrical engineering, as well as in other fields, problems have from time to time arisen which had to do with the consideration of heat transfer in a medium. These problems as a rule were left unsolved or were at most solved in a more or less make-shift manner, either by the cut and try method or in some of the more simple cases by mathematics.

With the advent of air conditioning and mechanical refrigeration, problems of this nature involving the flow of heat in various types of media have become of increasing importance. These problems occur in extremely diverse and complicated forms and, from the practical view, are usually concerned with heat transfer in a solid and the bounding faces of the solid.

Such problems may be classified into two classes; first, the steady state which occurs after the temperatures have become stabilized, and, secondly, the unsteady or transient state, wherein the temperatures and rate of heat flow change as a function of the time.

The first of these classes is relatively the more simple to solve. However, the complicated form of heat flow path that is usually present in the problem makes this class quite difficult to solve. In the second class, dealing with transient conditions, the problem becomes as a rule so difficult and requires such laborious and extensive calculations that it becomes impracticable to even consider in most cases a mathematical solution.

In view of the difficulties encountered with problems of the foregoing nature, the present invention seeks to provide a machine or device which may be utilized to solve these intricate and complicated problems in a quick and accurate manner, and which will eliminate the laborious and tedious methods now employed.

Aside from the commercial aspects of the present invention, the invention is particularly useful in schools and colleges as an instrument for visually demonstrating the transient conditions attending the transfer of heat in a medium. Of course, in this connection it may also be used by the students for solving problems dealing with the flow of heat in a medium.

While the present invention will be described in connection with its use in the calculation of problems having to do with heat flow, and temperature rise and fall in a heat conducting medium, it will be evident to those skilled in the art that the invention may with equal facility be utilized for the solving of any problem where the governing laws are similar to those of heat transfer.

In its broad concept, the invention embodies an instrument in which certain principles and laws of hydrodynamics are made to behave and made analogous to the behavior of heat in certain classes of heat transfer situations. By imitating each situation, the invention not only visibly demonstrates these problems but at the same time solves them.

In accordance with the general features of the invention, it is proposed to provide a plurality of glass standpipes or storage tubes which simulate the thermal capacity of predetermined increments of the medium under consideration, metal flow tubes which are calibrated to give a predetermined resistance to the flow of fluid therethrough, a tank for containing a supply of fluid, this tank being mounted for adjustment so that the flow of fluid may be varied at will, manifolds, and rubber tubing connectors, all of which may be readily connected to set up a desired combination and which may be operated in such a manner as to visually demonstrate the flow of heat through different sections of the medium and solve problems having to do therewith. Although I have stated that the above parts are made of specific materials, it will be appreciated that any suitable materials may be utilized for these parts.

Other features of the invention reside in the novel arrangement of the parts of the machine so as to facilitate the setting up of different problems thereon, and in valve means for the control of the flow of fluid during the operation of the machine and the solving of a problem.

Other objects and features of the present invention will more fully appear from the following detailed description taken in connection with the accompanying drawings which illustrate a single embodiment thereof, and in which:

Figure 1 is a plan view of a rod, the thermal characteristics of which will be considered in connection with the operation of the present invention;

Figure 2 is a view diagrammatically illustrating the theory and principle embodied in the operation of the herein described invention;

Figure 3 is a fragmental view in elevation of the machine or apparatus for practicing the herein described invention;

Figure 4 is an enlarged fragmentary plan view partly in section showing certain of the operative instrumentalities of a device embodying the principles of the present invention;

Figure 5 is an enlarged fragmentary end view of the same, certain portions being cut away to disclose details of certain of the parts of the device;

Figure 6 is an enlarged fragmentary transverse sectional view through a portion of the device, taken substantially on line VI—VI of Figure 4;

Figure 7 is a fragmentary view showing details of a valve operating mechanism, certain of the parts being in section, taken substantially on line VII—VII of Figure 6;

Figure 8 is a fragmentary detail view, partly in section, to show the details of a valve mechanism utilized in the present invention, taken substantially on line VIII—VIII of Figure 6;

Figure 9 is an enlarged view in elevation having cut-away portions to show the details of the mounting for the calibrated resistor unit; and Figure 10 is a view showing the details of the arrangement for varying the storage capacity of the fluid storage tubes or standpipes.

As shown on the drawings:

In order that the basic principles of operation and the theory of the present invention may be more readily understood, it is thought advisable to consider a simple unsteady state problem.

For this purpose, it will be assumed that it is desired to consider the heat transfer in a rod of uniform cross-section, which is perfectly insulated so that heat may flow from one end to the other when a predetermined temperature is applied at one end of the rod. It will be apparent that if, by forced convection of a hot gas, heat is applied at one end of the rod, for example, at a temperature of 100 degrees, the end at which the heat is being applied will begin to rise in temperature, and the variation of temperatures with time through all points in the rod will produce an unsteady state condition. In order that the temperatures through the rod may be considered at definite points, let it be assumed that the rod is divided into a number of equal increments or sections, in this case five sections. Each increment or section will have a definite thermal capacity in terms of its ability to absorb units of heat per degree rise in temperature. In solving a problem of this type, the thermal capacity of each increment or section would be considered as being concentrated or lumped at the central point of the section. These points are designated as A, B, C, D and E in Figure 1.

Considering that the heat is being applied at the left end of the rod, as shown in Figure 1, it will be apparent that the end of the rod will present a finite resistance to the flow of heat from the heat source into the rod or the first section of the rod. This resistance is represented by $a$. within the rod, there would be a finite resistance depending upon the conductivity of the rod to the heat in flowing from the end surface in section A to the midpart thereof. This resistance may be represented by $a'$. Likewise, a resistance will be offered to the flow of heat from the midpoint of the section to the right end of the section, this resistance being indicated as $a''$. The same conditions prevail in sections B, C, D and E, the respective resistances being indicated by $b'$—$b''$, $c'$—$c''$, $d'$—$d''$, and $e'$—$e''$.

Since the thermal capacity of each section has been considered as being concentrated at the central point thereof, the resistance to the flow of heat from the central points of the sections would, it will be apparent, constitute, for example, $a''$ plus $b'$ between points A and B. The total resistances from the source of heat to point A may be represented by $m$; from A to B, by $n$; from B to C, by $o$; from C to D, by $p$, and from D to E, by $q$. This resistance to the flow of heat may be stated as the number of degrees difference in temperature it would take to transfer one unit of heat, in unit time, through this path.

In the present invention, the conditions present in heating the above rod are hydraulically simulated and the principles and laws of hydrodynamics are made to behave in a way analogous to the behavior of the heat transfer in the rod. In Figure 2, glass tubes or standpipes are provided, these tubes being indicated as A', B', C', D' and E' to correspond to the sections A, B, C, D and E of the rod under consideration. These standpipes or tubes are of a cross-section such that the rise of water level in the tubes will simulate the thermal capacity and rise in temperature of the respective sections of the rod.

In order to further carry out the analogy, it is necessary to have some form of connector between each of the standpipes, these connectors being of such a nature as to resist the flow of fluid from one standpipe to the other in the same manner that there is a resistance to the flow of heat from the center of one section to the center of the next section of the rod under consideration. For this purpose, it has been found that small-bore tubes may be proportioned so as to have viscous flow under all conditions and that if proper precautions are taken to reduce errors due to end effects, bending of the tubes and the like, the rate of flow through these connectors will be proportional to the difference in the heads of water in the interconnected standpipes.

In the problem under consideration, it will be apparent that four equal resistor tubes will be needed to connect the five standpipes which represent the five sections of the rod. To represent the thermal resistance $a'$ of the rod occurring between the left end of the rod and the center of the first section, a resistor tube with half the resistance of the others will be needed.

A fluid supply, represented at F, is provided, and this supply of fluid is contained in a tank which is supported so that it may be raised and lowered to effect any desired variation of head between its maximum minimum limits. Raising and lowering this tank would correspond to an increase or decrease in the temperatures of heat being applied to the end of the rod. As before stated, the end of the rod presents another thermal resistance which is determined by forced convection phenomena. This is also a constant resistance and may be computed providing the convection heat transfer coefficient is known. A resistor tube is now provided which imitates this resistance at the end of the rod. This resistance bears the same ratio to the resistance of the tubes used between the standpipes as exists between the surface heat transfer resistance and the internal thermal resistance from one section to the next section. This resistance is indicated by $a$.

Having set up the apparatus with the proper resistor tubes between the standpipes, and having filled the tank with fluid, the operation would be as follows:

The tank water level is brought to a low position in order to bring the water levels of the respective standpipes to corresponding position which might represent the heat in the rod. The tank is now raised to a proper level above the water in the standpipes corresponding to the temperature of the heat that is being applied to the end of the rod. When the water is permitted to flow, the rising of the water in the several standpipes or tubes will visibly demonstrate the rising of the temperatures in the several sections of the rod.

A scale G is provided for indicating the height of levels in the tubes. In order to interpret the readings on this scale, it is merely necessary to know the equivalent between heat in the physical state and the water in the standpipes. Any consistent set of units may be used. For example, a cubic inch of water in the standpipe may represent 1 B. t. u. and one inch rise of water may represent 10 degrees Fahrenheit, etc. One the tubes and pipes are calibrated, any set of equivalences may be applied. It will therefore be apparent that the water rising in the respective tubes will visibly demonstrate the rising of the temperatures in the several sections of the rod, and that if readings are taken of the water levels at proper time intervals, these readings will be found to closely check with the actual temperatures as might be determined mathematically.

In the actual construction of the resistors used for connecting the respective standpipes, it has been found that a tubing having an approximate inside diameter of 0.05 inch is very satisfactory. Of course, there are some conditions wherein it is conceivable that tubes of greater or less diameter may be necessary. In the case of tubes having a diameter much less than 0.05 inch, there is an increased tendency for the tube to become clogged, in which case special clog preventing means may be necessary. From the known laws for the viscous flow of fluid through tubes, it is known that the resistance (ratio of difference in head to rate of flow) varies inversely with the fourth power of the radius. It will therefore be seen that a larger tube is impracticable as, for example, if the diameter were doubled, a tube 4 inches long would have to be replaced by one 64 inches long. Such tube would, in a device of this type, be very inconvenient to handle.

As a practical matter, it will be apparent that a device embodying the principles of the present invention will have to be so constructed as to permit the setting up of a large variety of problems. As a practical matter, in order to enable the ready interconnection of the resistor or flow tubes so that they may be added in series by means of rubber connectors and also so that they may be connected to standpipes without using long runs of rubber tubing, it is necessary to bring all the resistor tube ends into a small working plane. That is, a tube cannot be left straight, but it is desirable to bring the two ends of the tube into close proximity. Necessarily, this means bending the tube, and it has been determined by hydrodynamic experiments that the viscous flow in a curved tube takes a corkscrew path. Moreover, it has also been shown that the rates of increase of resistance with velocity increase for such cases. It is therefore necessary that sharp bends and kinks be avoided.

Orifice effects at the ends of a tube, and the contraction and enlargement effects occurring wherever changes in diameter in the flow circuit occur, introduce resistances that vary with the square of the velocity. By maintaining proper proportions and velocities at a low value, these errors are substantially negligible.

The use of the present invention is not limited to the illustration and solving of simple problems, such as the rod considered above. The solid being heated or cooled may have a high degree of complexity, such, for example, as may be found in a furnace wall, a house wall, a die for glass ware, a rubber mould, or as found in an electric motor or generator, or the like. The solid may be divided into convenient block increments or sections. It will be apparent that an interior increment of a solid may have as many as six heat flow paths to the six adjacent increment blocks or sections, and each path may offer a different thermal resistance. Also, each increment may have a different thermal capacity. It will therefore be apparent that from a practical matter, a machine or device embodying principles of the present invention would necessarily be provided with a considerable number of standpipes and that these standpipes may be arranged as will hereinafter be described so as to have adjustable capacity, and that a large number of flow or resistance tubes must be available. With such a device, complicated problems may be simulated and solved by having proper interconnections between the standpipes which are adjusted to have the desired thermal capacities, depending upon the conditions being considered. Moreover, the present invention is not limited to problems wherein the surface heat transfer phenomena is of the forced convection type, that is, in which the surface resistance is constant. A great variety of problems may arise in which radiation and natural convection occur, thereby calling for a variation in the coefficient or surface resistance. While a varying surface resistance may be simulated by the use of a flow tube having a variable flow resistance, it has been found practicable to use a constant resistance tube and to adjust the tank level to computed positions as the run progresses. Such procedure has proved very successful.

Another variety of problems which may be solved on the device of the present invention is, as before mentioned, in connection with electrical apparatus wherein the heat is produced in the solid itself. In problems of this type, provision may be made to run water by means of selected flow tubes into the tops of the standpipes, thereby producing "heat" at the right rate within the standpipes that represent the increments or sections of the solid.

In the foregoing, the basic theory and method of operation of the herein described invention has been considered and also the different types of problems which may be solved. The machine or apparatus embodying the features and principles of the invention will now be described.

In the illustrated embodiment of the device of this invention, the various operative instrumentalities are mounted with a view to facilitating their interconnection in setting up the problems in heat flow which it is desired to solve therewith. The instrumentalities are supported on a skeleton-like framework which is of L-shape and is generally indicated at 11. This framework constitutes a base portion 12 having a rectangular box-like framework extending upwardly at right angles therefrom at its rear portion, this vertically extending framework being indicated at 13.

Extending across the forward face of the framework 13, there is disposed a pair of spaced horizontally extending frame members 14 and 15 of angular cross-section, which serve as supports for a plurality of tubular vertically disposed manifolds 16 which are respectively associated with each of the standpipes or storage tubes 17. These tubes are connected in each case to an end nipple 18 at the top end of the manifold by means of a rubber sleeve connection 19. The upper ends of the standpipes are supported by suitable U-shaped brackets 20 which extend through a transverse frame member 21.

Each of the manifolds 16 is provided at its lowermost end with an end nipple 22, and at its rear adjacent the lower end with a rearwardly extending nipple 23. On the forward side of the first two tubes from the left as viewed in Figure 3, the manifolds are provided adjacent the upper ends thereof with a forwardly extending nipple 24, and the other manifolds are provided with a pair of forwardly extending nipples 25 and 26, the nipples 25 and 26 of the first tubes being horizontally aligned, as shown in Figure 3.

The vertically disposed framework 13 houses a pair of adjustable tanks 27 and 28 for the fluid supply, these tanks being arranged to be elevated and lowered individually. Each tank is supported from a flexible strap member 29 which is trained over a pair of guide pulleys 30 and 31 which are rotatably supported on countershafts 32 and 33, these countershafts being supported from the upper portion of the frame in suitable end brackets. The tanks are respectively counterbalanced by weights 33 and 34 connected to the other end of the strap member. These weights are guided during the raising and lowering of the tanks by suitable guide rails 35 and 36 in the case of weight 33, and 37 and 38 in the case of weight 34. This arrangement enables the tanks to be adjusted to any desired height, and when so adjusted, these tanks will remain in the adjusted position, thereby enabling the head of fluid supply to be varied for different conditions.

The tank 27 is connected through a flexible connection 39 to the rearwardly extending nipple 23 of the left hand tube, as shown in Figure 3, and the tank 28 is likewise connected through a connection 40 to the corresponding nipple of the manifold of the second standpipe from the left, as viewed in Figure 3.

Referring to Figure 5, it will be seen that there is disposed in front of these aligned manifolds 16, a tank arranged to have two separate compartments, namely, compartment 41 and compartment 42, which are interconnected through a bracket 43 by means of which the compartment 41 is supported on the compartment 42. The compartment 41 contains a plurality of manifolds corresponding in number to the number of standpipes or storage tubes in the device. The manifold arrangement is clearly shown in Figure 4.

At the forward and rear sides of the compartment 41, a pair of headers 44 and 45 are supported on the bottom of the compartment 41. Each of these headers is composed of a tubular member having closed ends. The header 45 is provided at its left end with an upwardly extending nipple 46, by means of which a connection may be made through a tubular conductor 47 to the forwardly extending nipple 24 of the first standpipe manifolds. The header 44 is provided with an upwardly extending nipple 48 to permit connection through a flexible tubing 49 to the manifold nipple 24 of the second standpipe assembly.

Supported on the headers 44 and 45 are a plurality of transversely extending headers 50 which are respectively in alignment with the other standpipes or tubes. The headers 50 are provided with a plurality of upwardly extending nipples 51 to provide manifold connections thereto. Adjacent the manifold headers 50, the headers 44 and 45 are provided with upwardly extending nipples 52 and 53 for facilitating connections from the headers 44 and 45 to any one of the manifolds 50. The nipples 51, 52 and 53 are plugged or otherwise closed when not being used.

The compartment 42 has supported therein a partition member 54 which supports a plurality of aligned rows of standard calibrated flow or resistor tubes 55 having their ends terminating to form nipples extending above the partition 54, as shown at 56 and 57. It will be apparent that with the manifold connections just described and the multiplicity of standard calibrated flow tubes, it is possible to connect, by means of flexible tubing, the flow tubes to the standpipes so as to set up any desired problem that is to be solved on the device of the present invention. The flow or resistor tubes are preferably calibrated at some predetermined temperature, and, in order that the resistance of these tubes may be maintained substantially constant, it is contemplated that the compartment 42 will contain a liquid which will surround the resistor tubes and, if necessary, this liquid will be maintained by some means, such as an electrical heater with thermostatic control, at a substantially constant temperature.

In certain problems, it is desirable to control the flow of fluid into and out of the standpipe tubes having the double nipple connection through nipples 25 and 26 by means of a gang valve mechanism whereby these standpipes may be simultaneously controlled. For this purpose, a plurality of rod members 58 are loosely supported at their lower ends in a tubular horizontally disposed member 59 which is secured on the front faces of the manifolds 16 of the standpipes assemblies. These members 58, as shown in Figure 7, respectively extend between the tube connections to the nipples 25 and 26 of the manifolds 16 and have their upper ends loosely engaged by a common tubular operating bar 60 which carries a pair of spaced abutment members 61 and 62 arranged to be engaged by a cam 63 carried by a rotatably mounted crank 64. The bar 60 may be shifted in one direction by turning the crank in that direction, or in the opposite direction when the crank is turned in the opposite direction. This action will simultaneously tilt or rock all the members 58 so that the tubular connections on one side or the other will be compressed, depending upon which way the crank is operated. Cooperating with the members 58 there is placed on each side of the tubular connections to the nipples 25 and 26 stationary clamping members 65 and 66. These members also serve as spacers between a frame member 67 and a plate 68 which serve to guide the members 58 during the shifting thereof in one direction or the other.

In connection with this gang valve, it will be observed that it embodies the novel feature of decompressing one of the tubular connections as the other is being compressed. By making the tubular connections to the nipples 25 real connectors, and the tubes on the nipples 26, dummy connectors having their outer ends blocked, it is possible to control the flow through the real connectors without changing the level of the fluid within the associated standpipes or storage tubes as a result of the squeezing and unsqueezing of the real connectors. More specifically, if one of the real connectors were unsqueezed or decompressed, there would be an undesirable drop in the level of the liquid in the associated standpipe, but due to the simultaneous compression or squeezing of the dummy connector connected thereto, the level is restored at the same rate that it is being dropped. The result therefore is a maintained level during the operation of the valve.

For some conditions of operation, it has been found desirable to have each of the standpipes connected to a common header through individual valve control means. For this purpose a tubular header 69 is supported on the framework below the headers 16 of the respective standpipes, the lower end nipples 22 being in each case connected through a tubular conductor 70 to corresponding nipples 71 of the header 69.

For controlling the flow of fluid through the tubular connection 70, a novel valve or clamp control is provided. The tube 70 is carried through an opening in each case in a U-shaped member 72 which is suitably supported on the frame structure and extends across the front face of the vertical framework 13. At each standpipe assembly, a rod member 73 is loosely engaged at its upper end in the tubular member 59, and at its lower end it is hingedly secured to the innermost end of an operating lever 74 which is supported for longitudinal sliding movement in a bracket 75. At its outer end, the operating lever 74 is hinged to one end of a link 76, which has its other end pivoted to the frame structure. It will be apparent that when the outer end of the lever 74 is raised, the link 76 will move in an arc so as to shift the operating lever 74 longitudinally in the bracket 75. This action will shift the rod member 73 rearwardly. The rod member 73 carries a triangularly shaped clamping member 77 which has a clamping bar 78 arranged to cooperate with the forward side of the U-shaped member 72 to clamp and unclamp the tubular connection 70 for controlling the flow of fluid therethrough. When the member 73 is shifted rearwardly, the bar 78 disengages the tubes and permits the flow of fluid therethrough. Now, if the outer end of the lever 74 is actuated so that the link 76 rotates in the opposite direction, the member 73 will be moved away from the U-shaped member 72, whereby the clamping bar 78 is pressed against the tube 70 and cooperates with the forward end of the U-shaped member to cut off the flow of fluid through the tube 70. The link 76 is so arranged that during the opening and closing of the valve mechanism just described, the operating lever 74 will be locked in either the open or closed position by virtue of the link passing through dead center position. With the foregoing arrangement, gang operation of two or more of the levers 76 may be easily accomplished simply by connecting them together with a gang bar which may be arranged to slip over the ends of the levers.

There are times when it is very desirable to flush out the various standpipes and resistors, and in order that the device of the invention may be self-contained, an auxiliary supply tank 79 is supported on the top of the upright framework 13, and the framework houses in its lower portion a reservoir 80. By means of suitably placed nipples and connection tubing, the supply tank 79 and the reservoir 80 may be connected through suitable valve means to the header 69. By the proper manipulation of the control valves of the device, it is readily convenient to cause water to flow from the supply tank 79 through the various tubes and connections and into the reservoir which may be arranged for easy draining.

The auxiliary supply tank 79 is also utilized in cooperation with the main supply for the solving of certain types of problems. It has been found that there are numerous problems in which a solid develops heat within itself, due to flow of electric current, or to chemical changes of state, etc. The simulation of this heat phenomenon is carried out by introducing additional fluid into the storage tubes from the auxiliary supply tank in at least two ways.

(a) If the device is operated continuously, fluid may be selectively introduced into the fluid storage elements continuously by a connection from the tank 79 through a proper resistor means to the desired storage element.

(b) Where the solution of the problem is attained by dividing the passage of time into steps or increments, for example, two minute intervals, and the device is alternately operated for one increment and then shut down for the next increment and so on. Under these conditions, the additional fluid may be introduced into a storage element all at once, during shut down, enough fluid being then introduced to represent all the heat that will be produced during the next time increment. It will therefore be apparent that the auxiliary supply, aside from its use in flushing out the device, forms a very important part of the device, when solving certain types of problems.

As has been previously explained, there are certain types of problems which require that the storage capacity of the standpipes 17 can be varied. For this purpose, as shown in Figure 10, the device of this invention would be provided with auxiliary standpipes which are mounted for tilting adjustment. One of the auxiliary standpipes 17' is shown in Figure 10 connected to the nipple 23 of one of the manifolds 16 by means of a tubular connection 81. The tube 17' is supported on a pivotally mounted framework generally indicated at 82 and which is swingable on a pivot 83, which permits the auxiliary standpipe to be disposed in a vertical position or an intermediate position, this standpipe being shown in dotted lines tilted to a position 60 degrees from the vertical position. When the auxiliary standpipe is thus inclined 60 degrees from the vertical, its capacity per vertical unit will be doubled. Movable with the framework 82 is an arcuate member 84 which is provided with suitable spaced graduations so that it is possible to determine the angle at which the auxiliary standpipe is adjusted and consequently its capacity in that position.

From the foregoing description, it will be apparent that the present invention provides a novel calculating machine or device, by means of which problems dealing with the flow of heat through a medium may be readily solved and visually illustrated; and in which the laws of hydrodynamics are utilized in setting up a hydraulic analogy of the problems being considered; and in which novel means are employed for accomplishing this purpose.

It is of course to be understood that although I have described in detail the preferred embodiment of my invention, the invention is not to be thus limited but only insofar as defined by the scope and spirit of the appended claims.

I claim as my invention:

1. A device of the character described for calculating thermal variations in a medium when it is subjected to predetermined temperature conditions, said device comprising a plurality of interconnected fluid storage elements having cross sections proportional to the heat capacities of predetermined portions of said medium, a fluid supply of variable head calibrated, resistor means for opposing the flow of fluid between the respective storage elements, and means for indicating the fluid levels in the respective storage elements.

2. A device of the character described for calculating thermal characteristics of a medium composed of a plurality of sections of predetermined heat capacities when the medium is subjected to predetermined temperature conditions, said device comprising a plurality of fluid storage tubes having relative capacities corresponding to the relative heat capacities of said sections, conduits interconnecting said tubes, said conduits being calibrated to have determinate resistances to the flow of fluid therethrough, a fluid supply having its head variable in accordance with the temperature to which said medium is subjected, and means for indicating the height of fluid in the respective storage tubes.

3. A device of the character described for calculating the transient thermal characteristics of a medium when it is subjected to predetermined temperature conditions, said device comprising a plurality of interconnected fluid storage elements simulating the respective thermal capacities of predetermined sections of said medium, resistor means associated with the connections between said elements calibrated in accordance with the conductivity of the medium in said sections, a fluid supply having its head variable in accordance with the temperature to which said medium is subjected, and means for indicating the fluid levels in the respective storage elements.

4. A device of the character described for calculating the transient thermal characteristics of a medium when it is subjected to predetermined temperature conditions, said device comprising a plurality of interconnected fluid storage elements, a fluid supply of variable head connected to certain of said storage elements, scale means for indicating the fluid levels in the respective storage elements, and resistor means for opposing the flow of fluid between the respective storage elements, said means comprising calibrated conduits of such cross-sectional area that the flow of fluid therethrough will be streamline and not turbulent.

5. A device of the character described for calculating thermal characteristics of a medium when subjected to predetermined temperature conditions, said device comprising a plurality of interconnected stationary fluid storage elements for simulating the thermal capacity of predetermined sections of said medium, tiltably mounted tubes connected in parallel with certain of the stationary tubes whereby the thermal storage capacity represented by a stationary and tiltable tube may be varied, a fluid supply of variable head, resistor means for opposing the flow of fluid between the respective sets of storage tubes, and means for indicating the fluid levels in the respective stationary storage elements.

6. In a device of the character described for calculating thermal characteristics of a medium when subjected to predetermined temperature conditions, a fluid supply adjustable to vary the head thereof, a vertically disposed stationary storage tube, a tiltably mounted tube connected in parallel with the stationary tube, said tubes being connected as a set to said supply and having their storage capacity adjustable in accordance with the thermal capacity of a section of the medium under consideration, a resistor element to determine the flow of fluid to said set in accordance with the conductivity of said medium, and valve means to control the flow of fluid from said supply.

7. In a device of the character described for calculating thermal characteristics of a medium when subjected to predetermined temperature conditions, a fluid supply adjustable to vary the head thereof, a vertically disposed stationary storage tube, a tiltably mounted tube connected in parallel with the stationary tube, said tubes being connected as a set to said supply and having their storage capacity adjustable in accordance with the thermal capacity of a section of the medium under consideration, calibrated resistor elements for determining the rate of flow of fluid to and from said set of storage tubes in accordance with the rate of flow of heat energy into and out of a selected section of said medium, and valve means to control the flow of fluid from said supply.

8. In a device of the character described for calculating thermal characteristics of a medium when subjected to predetermined temperature conditions, a fluid storage tube for simulating the thermal capacity of a section of said medium, an inlet connection to said tube, an outlet connection to said tube, said connections being of flexible material and corresponding areas, and valve means for controlling said connections including parts operative to depress one of said tubes and thereafter compress the other of said tubes whereby the volume of liquid in the fluid storage tube is maintained constant during the valving operation.

9. In a device of the character described for calculating thermal characteristics of a medium when subjected to predetermined temperature conditions, a fluid storage tube for simulating the thermal capacity of a section of said medium, an inlet connection to said tube, an outlet connection to said tube, and valve means for opening one of said connections and closing the other of said connections without varying the fluid level in said storage tube.

10. In a device of the character described for calculating thermal characteristics of a medium when subjected to predetermined temperature conditions, a plurality of interconnected fluid storage elements, a main fluid supply of variable head connected through a valve to said elements, resistor means for opposing the flow of fluid between the respective storage elements, valve means to individually control fluid connections to each of said storage elements from an auxiliary fluid supply whereby the additional fluid may be selectively added to said storage elements when the main supply is cut off.

11. In a device of the character described for calculating thermal characteristics of a medium when subjected to predetermined temperature conditions, a fluid storage tube having a flexible tubular fluid connection, and valve means for opening and closing said connection, said means comprising a stationary abutment member on one side of said tube, a movably mounted clamping member including a bar engageable with the tube on the side opposite the abutment member, and lever means operative to shift said bar towards and away from the abutment member whereby the tubular connection is compressed and decompressed to control the flow of fluid therethrough.

12. In a device of the character described for calculating thermal characteristics of a medium when subjected to predetermined temperature conditions, a fluid storage tube having a flexible tubular fluid connection, and valve means for opening and closing said connection, said means comprising a stationary abutment member on one side of said tube, a movably mounted clamping member including a bar engageable with the tube on the side opposite the abutment member, and lever means operative to shift said bar towards and away from the abutment member whereby the tubular connection is compressed and decompressed to control the flow of fluid therethrough, said lever being supported for movement through a dead center position in compressing and decompressing the tubular connection.

13. A device of the character described, comprising a plurality of fluid storage tubes having inlet and outlet connections, a plurality of calibrated resistor units, a fluid supply having a variable head, and flexible connectors for selectively interconnecting the fluid supply, storage tubes and resistors for hydrodynamically simulating the flow of heat through a medium subjected to predetermined temperature conditions.

14. In a calculating device of the character described, a plurality of series connected fluid storage elements, calibrated resistor means in the connections between said storage elements for opposing the flow of fluid between the respective storage elements, a source of fluid supply, valve means to selectively control the flow of fluid from one storage element to another through said resistor means and directly from said source to said storage elements irrespective of said resistor means.

ARTHUR D. MOORE.